United States Patent Office 3,438,263
Patented Apr. 15, 1969

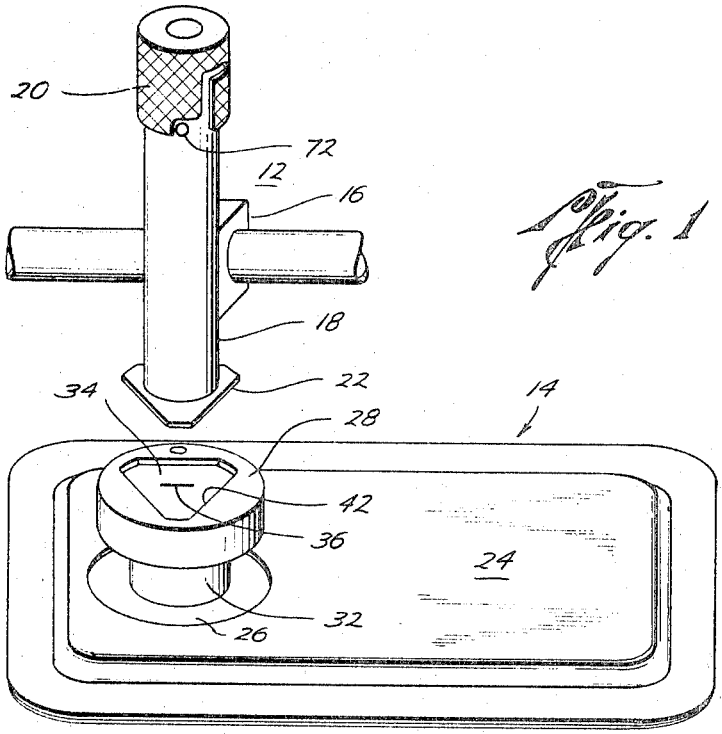
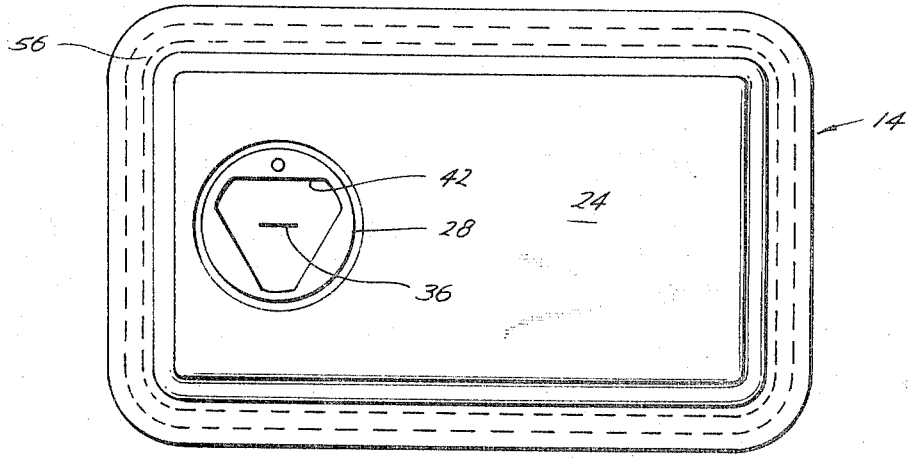

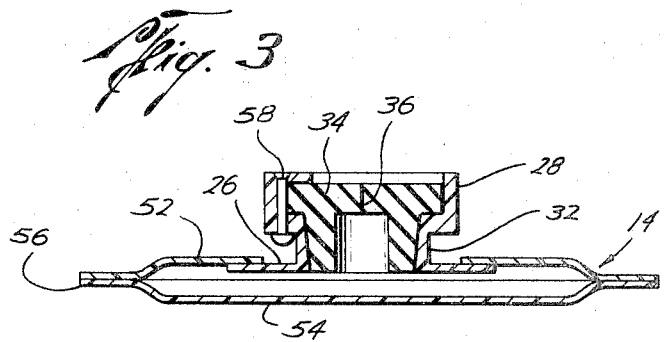
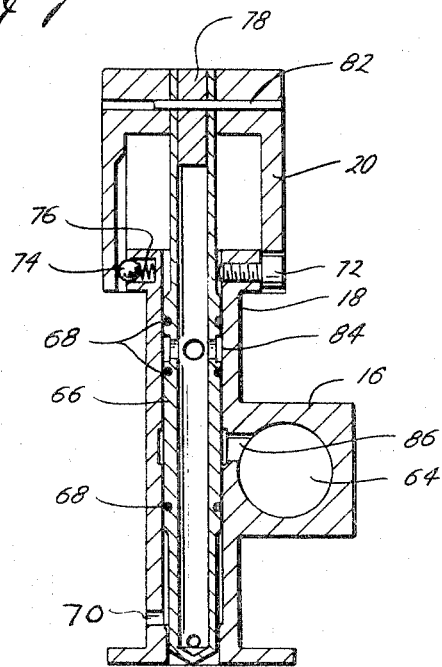
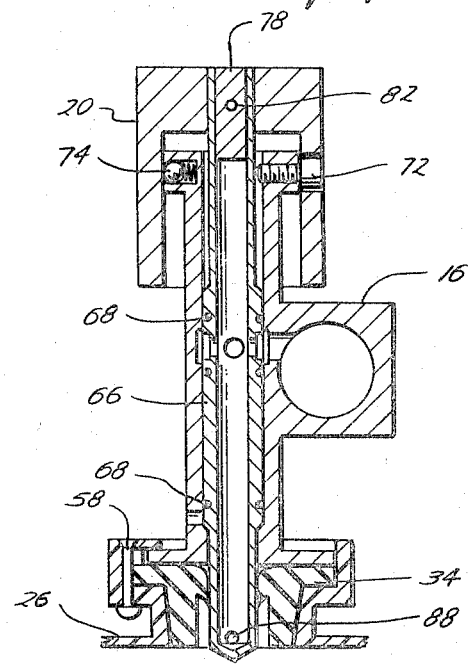

3,438,263
FLUID SAMPLE COLLECTOR
James E. Webb, Administrator of the National Aeronautics and Space Administration with respect to an invention of David Cohen, St. Joseph, and Samuel E. Stone, Berrien Springs, Mich.
Filed Mar. 28, 1968, Ser. No. 716,795
Int. Cl. G01n 1/10
U.S. Cl. 73—422                                    4 Claims

ABSTRACT OF THE DISCLOSURE

A fluid sample collector has a sampling section and a collection section. The collection section comprises a plastic sac having a collar with a rubber plug thereon for interconnection with the sampling section. The sampling section contains a flange plate which may be rapidly connected and disconnected from the collection section. Fluid from a feed line is coupled into a hollow member within the sampling section. The hollow member may be inserted through the rubber plug into the sac of the collection section. When the fluid sample has been taken, the hollow member of the sampling section is removed from the rubber plug of the collection section and the sampling section and collection section are then disconnected.

---

The invention described herein was made in the performance of work under a NASA contract and is subject to the provision of Section 305 of the National Aeronautics and Space Act of 1958, Public Law 85–568 (72 Stat. 435; 42 U.S.C. 2457).

The invention relates in general to fluid handling, and more particularly to a system for sampling and storing liquid which is passing through a feed line.

In manned spaceflight it is necessary to test certain samples of the astronauts' waste products to determine the effect of weightlessness on man. One of the waste products which must be sampled and tested at the end of the flight is urine.

As is well known, due to the lack of gravity in manned spaceflight, stored liquid behaves in a manner not normally attributed to it where normal gravity is present. Thus, it becomes necessary when storing liquid to provide means for disconnecting the sample holding device from the main body of fluid to be sampled in a manner such that leakage from both main body and sample holder will not occur. Further, such a system must be simple to use so that the astronaut can perform these tasks in a spacecraft in a simple and speedy manner so as not to be time consuming. Conventional fluid sample containers such as specimen bottles or test tubes cannot readily be utilized in such applications due to the problems of leakage and speed. In addition to leakage problems, problems relating to the storage of the samples must be overcome.

In order to overcome the problems relating to conventional fluid sampling devices, the present invention provides a non-breakable fluid storage container having means for rapidly connecting a source of fluid into a storage container, filling the storage container with fluid, and then rapidly disconnecting the source from the container.

More particularly, the invention comprises a sampling section and a collection section. The sampling section is coupled to a feed line through which fluid passes. The feed line is coupled to a stem line through an orifice. The stem line is connected to the collection section by means of a flange plate. The collection section comprises a plastic sac which is capable of storing liquid. The sac is connected to a collar having a rubber plug therein. The flange plate is secured to the collar and upon rotation of a sleeve, a hollow pipe within the stem line is inserted through the rubber plug into the plastic sac. Then liquid from the feed line is transferred to the stem line and through the hollow pipe into the plastic sac. When the amount of liquid desired is transferred to the sac, the hollow pipe is removed from the rubber plug and the flange disconnects from the collar. The invention allows the connection between the sampling section and connection section to be made rapidly, and the collection section provides a secure leak-proof body.

The advantages of this invention, both as to its construction and mode of operation, will be readily appreciated as the same become better understood by reference to the following detailed description when considered in connection with the accompanying drawings in which like reference numerals designate like parts throughout the figures and wherein:

FIG. 1 depicts a perspective view of the sampling section and collection section of the fluid sampling and collection system in accordance with this invention;

FIG. 2 depicts a top view, partly in section, of the collection section of FIG. 1;

FIG. 3 depicts a side view in section of the collection section as depicted in FIG. 2;

FIG. 4 depicts in section the sampling section of FIG. 1; and

FIG. 5 depicts in section the sampling section of FIG. 1 interconnected to a portion of the collection section.

Referring now to the drawings, there is shown a preferred embodiment of the fluid sampling and collection system in accordance with the invention comprising a sampling section 12 and a collection section 14. The sampling section 12 comprises a feed line 16 through which fluid passes which is coupled to a stem line 18 through an orifice (not shown in FIG. 1) upon rotation of a sleeve 20. Further, a somewhat triangular shaped flange plate 22 is secured to the end of the stem line 18 for connection with the collection section 14.

The collection section 14 comprises a sac 24 which is made of a plastic material capable of storing liquid wastes such as urine. A flange 26 is secured to one side of the sac 24. A collar 28 is connected to the flange 26 through a reduced diameter connecting section 32. Normally the flange 26, collar 28, and connecting section 32 may be made of an integral plastic section. Further, a rubber plug 34 having a slit 36 therein is secured within the collar and connection section. A somewhat triangular shaped opening 42 in collar 28 allows interconnection of the collection section 14 and sampling section 12.

Referring now to FIGS. 2 and 3, the collection section 14 is shown in greater detail. The sac 24 comprises an upper plastic sheet 52 and a lower plastic sheet 54 which are sealed together along the periphery 56 by conventional techniques such as by means of a heat seal. Further, the flange 26 is secured to the inner side of the upper plastic sheet 52, also by means of a heat seal. A pin 58 is placed through the collar 28 to limit the rotation of the flange plate 22, as will be explained hereinafter.

Referring now to FIGS. 4 and 5, there is depicted the sampling section in greater detail. The stem line 18 has secured thereto the feed line 16 having a circular passageway 64. A hollow pipe 66 is mounted concentrically within the stem line 18 and is movable axially thereto. O-ring seals 68 mounted on the outer circumference of pipe 66 contact the inner surface of the stem line 18. A weep hole 70 is provided in the stem line 18.

The sleeve 20 is rotatable and movable along the axis of the stem line 18 and secured to a minimum and maximum moving position by means of a pin 72 secured to the stem line 18. Further, the inner surface of the sleeve 20 frictionally engages the end of the stem line 18 by means of a ball 74 and spring 76.

The hollow pipe 66 is closed at one end by means of a plug 78 and is rigidly attached to the sleeve 20 by means of a pin 82 so that axial movement of the sleeve 20 will cause the hollow pipe 66 to move axially with respect to the stem line 18. The pipe 66 further contains orifices 84 so that when the sleeve 20 is rotated into the position shown in FIG. 5, an orifice 86 which is connected to the feed line 16 abuts the orifices 84 and allows fluid to pass from the passageway 64 to the inner portion of hollow pipe 66. The pipe 66 further contains orifices 88 at its end adjacent the flange plate 22 so as to allow fluid entering the orifices 84 to exit the pipe 66.

In the operation of the system, the flange plate 22 is placed in the opening 42 of collar 28 and abutting the rubber plug 34 with the hollow pipe 66 in the position shown in FIG. 4. Then the collection section 14 is rotated until the plate 22 abuts the pin 58. The sleeve 22 is rotated clockwise and pushed downward until a portion of the pipe 66 protrudes through the slit 36 in the plug 34 as shown in FIG. 5. Back pressure is then applied by conventional means to the feed line 16 so that fluid will flow into the feed line 16 to the orifice 86, the orifice 84, the hollow pipe 66, the orifice 88, and into the sac 24. After the sample has been taken, the sleeve 20 is rotated counterclockwise and pulled upward until the pipe 66 is withdrawn from the rubber plug 34. Then the collection section is rotated so that it is separated from the flange 22. It should be understood, of course, that the sampling section could be rotated relative to the collection section to obtain substantially the same result.

Because of the tightness of fit of the rubber plug 34 in the collar 28, sufficient pressure is placed on the rubber stopper to reclose and seal the slit 36 when the pipe 66 is withdrawn. Thus, the sample bag is reclosed and will satisfactorily retain the sample therein.

It should be understood that the foregoing disclosure relates only to preferred embodiments of the invention and that it is intended to cover all changes and modifications of the examples in the invention herein chosen for the purposes of the disclosure which do not constitute departures from the spirit and scope of the invention.

What is claimed and desired to be secured by Letters Patent is:

1. A fluid handling system comprising:
   (A) A collection section comprising:
   (1) a sac for storing liquid;
   (2) a collar coupled to said sac and having an opening therein leading into said sac; and
   (3) self-sealing means in said opening for normally closing said opening yet allowing liquid to be inserted in said sac through said opening; and
   (B) A sampling section comprising:
   (1) a feed line containing liquid to be stored in said collection section;
   (2) a stem line coupled to said feed line;
   (3) means for detachably connecting said sampling section to said collection section;
   (4) a hollow tubular member within said stem line and movable relative to said stem line for insertion into said sac through the opening in said sealing means, there being a passageway from said feed line into the interior of said tubular member for allowing liquid from said feed line to flow into said sac when the tubular member is inserted into said sac.

2. A fluid handling system in accordance with claim 1 and further comprising a rotatable member mounted onto said stem line and connected to said hollow member for inserting said hollow member into said sac upon rotation.

3. A fluid handling system in accordance with claim 1 wherein said self-sealing means comprises a rubber plug having a slit therein for allowing said hollow member to enter said sac.

4. A fluid handling system in accordance with claim 1 wherein said means for connecting said sampling section to said collection section comprises a flange plate secured to said stem line.

References Cited

UNITED STATES PATENTS

| | | | |
|---|---|---|---|
| 3,321,976 | 5/1967 | Jones | 73—421.5 |
| 3,374,678 | 3/1968 | McGuckin | 73—421.5 |

LOUIS R. PRINCE, *Primary Examiner.*

HARRY C. POST III, *Assistant Examiner.*